United States Patent [19]

Ala-Huikku et al.

[11] Patent Number: 5,677,256
[45] Date of Patent: Oct. 14, 1997

[54] METHOD OF PREPARING CATALYST COMPOSITION FOR POLYMERIZING OLEFINS

[75] Inventors: Sirpa Ala-Huikku, Helsinki; Pekka Sormunen, Porvoo, both of Finland

[73] Assignee: Neste Oy, Kulloo, Finland

[21] Appl. No.: 588,687

[22] Filed: Jan. 19, 1996

Related U.S. Application Data

[63] Continuation of Ser. No. 251,638, May 31, 1994, abandoned, which is a continuation of Ser. No. 930,530, Sep. 30, 1992, abandoned.

[30] Foreign Application Priority Data

Apr. 12, 1990 [FI] Finland ................................. 901895

[51] Int. Cl.$^6$ ................. C08F 4/44; C08F 4/02; B01J 31/00; B01J 37/00
[52] U.S. Cl. .......... 502/115; 502/104; 502/111; 502/120; 502/124; 502/125; 502/126; 502/127; 502/132; 502/134; 526/124.6
[58] Field of Search ............. 502/104, 111, 502/118, 119, 120, 124, 125, 126, 127, 134, 132, 115

[56] References Cited

U.S. PATENT DOCUMENTS

| | | | |
|---|---|---|---|
| 3,594,330 | 7/1971 | Delbouille et al. | 502/104 |
| 3,769,233 | 10/1973 | Hermans et al. | 502/105 X |
| 3,925,338 | 12/1975 | Ort | 502/103 X |
| 4,124,532 | 11/1978 | Giannini et al. | 526/125 |
| 4,174,429 | 11/1979 | Giannini et al. | 526/114 |
| 4,302,566 | 11/1981 | Karol et al. | 526/125 |
| 4,328,328 | 5/1982 | Minami et al. | 526/125 |
| 4,562,168 | 12/1985 | Lee | 502/119 X |
| 4,833,111 | 5/1989 | Nowlin | 502/107 |
| 4,855,271 | 8/1989 | McDaniel et al. | 502/125 X |
| 4,876,229 | 10/1989 | Furtek | 502/107 |
| 4,888,318 | 12/1989 | Allen et al. | 502/105 |
| 5,024,982 | 6/1991 | Hawley et al. | 502/110 |
| 5,143,883 | 9/1992 | Buehler et al. | 502/119 |
| 5,188,999 | 2/1993 | Duranel et al. | 502/111 |
| 5,278,118 | 1/1994 | Cuffiana et al. | 502/125 |
| 5,334,568 | 8/1994 | Demiddeleer et al. | 502/104 |
| 5,461,018 | 10/1995 | Ala-Huikku et al. | 502/115 |

FOREIGN PATENT DOCUMENTS

| | | |
|---|---|---|
| 0 006 110 | 1/1980 | European Pat. Off. |
| 0 166 970 | 1/1986 | European Pat. Off. |
| 0 173 471 | 3/1986 | European Pat. Off. |
| 0 296 561 | 12/1988 | European Pat. Off. |
| 70418 | 3/1986 | Finland |
| 78113 | 2/1989 | Finland |
| 91968 | 11/1989 | Finland |
| 84 03888 | 10/1984 | WIPO |

*Primary Examiner*—Glenn A. Caldarola
*Assistant Examiner*—J. Pasterczyk
*Attorney, Agent, or Firm*—Armstrong, Westerman, Hattori, McLeland & Naughton

[57] ABSTRACT

An olefin polymerization catalyst composition is prepared by adding an organometallic compound of a group IA to IIIA metal to a procatalyst containing a support impregnated with $TiCl_4$ but without using free $TiCl_4$ to impregnate the support. The procatalyst is prepared by stirring a carrier with magnesium dichloride and a titanium tetralkoxide in a hydrocarbon solvent containing an electron donor, evaporating the solvent and the donor to form a free-flowing powder and chlorinating the titanium tetralkoxide with an alkyl aluminum chloride.

6 Claims, No Drawings

METHOD OF PREPARING CATALYST COMPOSITION FOR POLYMERIZING OLEFINS

This application is a continuation of application Ser. No. 08/251,638, filed May 31, 1994, now abandoned, which was the continuation of application Ser. No. 07/930,530, filed Sep. 30, 1992, now abandoned, which was the national stage of International Application PCT/FI91/00111, filed Apr. 12, 1991, which claims the priority of Finnish application No. 901895, filed Apr. 12, 1990.

The present invention relates to a procatalyst composition which is suitable for homo- and co-polymerization of olefins.

The invention also relates to a method for preparation of such a procatalyst composition and its use together with an organometallic co-catalyst compound for polymerization of olefins.

BACKGROUND OF THE INVENTION

1. Field of the Invention

In the polymerization of olefins a Ziegler-Natta-catalyst system generally is used consisting of a so called procatalyst and a co-catalyst. The procatalyst is a component based on a compound of a transition metal belonging to some of the groups IVA-VIII (Hubbard, IUPAC 1970) of the periodic system of the elements. The co-catalyst again is a component based on an organic metal compound of a metal belonging to some of the groups IA-IIIA of the periodic system of the elements. The catalyst system usually also contains electron donating compounds which improve and modify the catalytical properties.

2. Description of the Related Art

It is conventional to use in the preparation of heterogenic polymerization catalysts as a component enhancing the polymerization activity of the procatalysts a support compound, on which the transition metal compound is superposed. The usual carrier compounds are based on silica, aluminum oxide, magnesium oxide, titanium oxide, a mixture thereof, carbon in different forms, and different types of polymers. As important carrier compounds have proved the magnesium compounds such as alkoxides, hydroxides, hydroxy halides and halides, of which the latter, in particular magnesium chloride, have recently become the most significant carrier components of procatalyst compositions.

Because magnesium compounds and in particular magnesium halides are not activated very efficiently in their base crystal form with a transition metal compound their crystal form has to be deformed. Traditionally the deformation of the crystal form is carried out by grinding e.g. in a ball mill typically resulting in a finely divided matter with a large specific surface, the particles of which have strongly deformed crystal lattices. Drawbacks of the usual grinding method include, however, that the grinding is very energy comsuming, causes wearing and corrosion of the apparatus, and is suited to the production of catalyst only with the tedious batch process.

A more modern method to provide a deformed crystal form of magnesium compounds such as a magnesium halide and thereby enhance its ability to become activated with a transition metal compound is to modify it chemically. Thereby a magnesium compound, optionally an electron donor and a transition metal compound are reacted, often in a solution, to an easily isolated procatalyst composition. Enough amorphous procatalyst is anyhow not formed in the process since the composition is more or less spontaneously crystallized in the preparation whereafter its morphology is not essentially changed.

U.S. Pat. Nos. 4,124,532 and 4,174,429 describe the preparation of this kind of catalytically active complexes by reacting a magnesium halide and a transition metal compound at a suitable ratio in an electron donor solvent. The finished complex can be separated through crystallization by evaporation of said solvent, or by mixing the complex with a solvent in which it isn't soluble. Because such complex compounds are formed as a result of a spontaneous crystallization, their crystall structure is very regular and activity rather limited.

U.S. Pat. No. 4,302,566 and EP Patent Application 6,110 describe a precursor formed by a magnesium halide, a transition metal compound and an electron donor. The precursor is formed by precipitation from an electron donor solution whereafter it is separated and mixed with an aluminumalkyl which is activating it and a separate inert carrier. In these processes an essentially amorphous procatalyst composition is not formed either, because the precursor in question is crystallized in the preparation spontaneously and its morphology is not essentially changed after that.

DE Patent No. 2,949,735 describes the dissolution of magnesium chloride into 2-ethylhexanol in kerosene, the addition of titanium tetra-butoxide to the cooled down complex solution and the use of the thus obtained catalyst solution together with an organic Al-chloride in the co-polymerization of ethene. Hence it is dealt with s non-supported catalyst solution, whereby a controlled morphology of the polymer particles is not obtained. The alcoholic hydroxyl groups which are deleterious in respect of the polymerizing activity are in that arrangement not either removed with a separate treatment.

EP Patent Application No. 166,970 describes the treatment of magnesium chloride with titanium tetrsbutoxide in heptane, the treatment of the surfaces of the particles obtained with an organic hydroxy compound such as an alcohol, a silanol or a phenol, the treatment of the product with s titanium halide and a polymeric silicon compound.

In the latter publication s solid procatalyst composition is prepared in two titanation stages which are difficult and sensitive e.g. to impurities.

U.S. Pat. No. 4,833,111 describes suspending of a silica activated at 600° C. into hexane, reacting of the surface hydroxyl groups of the silica with dibutylmagnesium, reacting of the magnesium with ethanol whereby the butyl group is substituted by a ethoxy group, and activating of the catalyst with titanium tetrachloride and ethyl aluminum dichloride.

SUMMARY OF THE INVENTION

The latter specification has as a drawback that in it as the magnesium compound an organometallic compound is used which doesn't itself carry a halogen needed in the formation of a catalytically active complex. The provision of a catalytically active interaction between magnesium and the transition metal hence requires the use of transition metal halides such as titanium tetrachloride. The sensitivity of this kind of a reagent e.g. to the moisture in the air in turn greatly hampers the activation of the carrier.

The purpose of the present invention is to provide a solid procatalyst composition which is to provide a solid catalyst composition, the activity of which is as high as or higher than 200 kgPE/gTi h and the titanium residue of which is less than 5 ppm in the polymer, and which has a spherical particle form, a particle size of more than 20 μm and a narrow particle size distribution. These objects have to be fulfilled as easily as possible and without the above mentioned drawbacks.

The problem has now been solved by a a novel procatalyst composition intended for polymerization of olefins, which composition is mainly characterized by what is said in the characterizing part of claim 1. It has thus been found that a useful procatalyst composition is easily obtainable by impregnating a separate, inert carrier with a magnesium halide, a transition metal compound dissolving said magnesium compound and containing no chlorine, and an electron donor, and by chlorinating with a chlorine compound containing no transition metal, or with a mixture of said chlorine compound and an organometallic compound. A procatalyst is thus obtained which has its chlorine/metal ratio at an optimal level in respect of the polymerization result.

DETAILED DESCRIPTION OF THE INVENTION

The invention has as compared with the solutions of the prior art as an advantage the controlled morphology of the catalyst thanks to the carrier, in particular the silica. Additionally the catalyst according to the invention has both a high activity and good hydrogen sensitivity and a good co-monomer sensitivity and the polymers obtainable with it have a narrow molecular weight distribution.

The use of a solution of a magnesium compound, an electron donor compound and a transition metal compound containing no chlorine for the treatment of the carrier makes it possible for one thing that a separate activation step with a transition metal compound is not needed but only the chlorination is enough, and for another thing, that a magnesium halide, preferably an anhydrous magnesium dichloride can be used as the magnesium compound instead of an organomagnesium compound and thus gain advantage of its structure in the production of a procatalyst composition which is as active as possible.

In the Finnish Patent Application 89-5703 a method for the production of a solid procatalyst composition has already been mentioned wherein a solid carrier is impregnated with a mixture of a Mg compound and a transition metal compound dissolving this Mg compound, and the resulting composition is chlorinated with a compound containing no titanium. The Mg/Ti ratio used in this process is usually of the order 0.5 and it can be of at most about 1, and the obtained polymerization activity as calculated in relation to titanium is typically 100–130 kg PE/g Ti. The remaining titanium in the polymer is over 10 ppm. The difference of this invention in relation to the mentioned Finnish Patent Application is that by the use of an electron donor a desired Mg/Ti mole ratio of at least 1, preferably between 1 and 4 can be provided, and at the same time a higher activity of the catalyst per the transition metal can be obtained. Polymerization activities thus are obtained with the catalyst composition according to the invention which typically are 200–500 kg PE/g Ti and then the titanium remainders are less than 5 ppm.

The carrier to be used according to the invention can be of whatever porous inorganic or organic material. Of the organic carriers the polymers can be mentioned. Especially preferable inorganic materials are based on oxides of silicon, aluminum, titanium, magnesium and/or chromium. Such materials are e.g. silica, aluminum oxide, magnesium oxide, magnesium silicate, titanium oxide, etc. Especially preferred carriers are silica, aluminum oxide and magnesium silicate or a mixture thereof. Most preferable is silica.

The physically bound water can optionally be removed thermally from the surface of the inert carrier by drying at a temperature under 200° C.

The surface hydroxyl groups of the carrier can optionally be removed thermally at a temperature above 200° C. or chemically by using agents reacting with the hydroxyl groups. The removal of the surface hydroxyl groups is, however, not necessary for the performance of the catalyst as is shown in the examples of the specification.

Agents suitable for the chemical removal of the surface hydroxyl groups of the carrier are organic silicon, aluminum, zinc, phosphorus and/or fluorine compounds. Of the suitable organic silicon compounds as the preferred ones may be mentioned the compounds of formula $(R_3Si)_2NH$ or formula $R_nSiX_{4-n}$, wherein R is a hydrogen and/or an alkyl group, X is a group reacting with the H of a hydroxyl group such as a halogen, and n is 1, 2 or 3. Of the preferred organic aluminum compounds the compound of formula $[R_nAlX_{3-n}]_m$ can be mentioned, wherein R is a hydrogen and/or a hydrocarbon group containing 1–20 carbon atoms, preferably a lower alkyl group, X is a halogen, n is 1, 2 or most preferably 3, and m is 1 or 2. Typical aluminum compounds are trialkylaluminums such as triisobutylaluminum, dialkyl aluminum halides such as diethyl aluminum chloride and dialkyl aluminum hydrides such as diisobutyl aluminum hydride. Preferred phosphorus compounds removing hydroxyl groups are phosphorustrihalides, phosphorusoxytrihalides, dialkyl phosphorus halides, monoalkyl phosphorus halides and diamino phosphorus oxyhalides. Suitable fluorine compounds for removing hydroxyl groups are gaseous fluorine, hydrogen/fluoride, boron/trifluoride, silicon tetrafluoride and sulphur/oxydifluoride.

The most preferred agents for removing hydroxyl groups are organic silicon compounds and organic aluminum compounds and of these the most preferred an hexamethyldisilazane $[(CH_3)_3Si]_2NH$ and triethylaluminum $(C_2H_5)_3Al$, respectively.

After the optional removal of at least physically bound water from the surface of the carrier it is impregnated with a magnesium halide compound, with one or several compounds of the transition metals belonging to the groups IVB or VB of the periodic system of the elements, which compounds dissolve the said magnesium compound and contain no chlorine, and with an electron donor compound which is dissolving/suspending the Mg compound. It can according to one embodiment be carried out by contacting the carrier with a mixture which has been formed from a magnesium halide compound, from one or several transition metal compounds of the groups IVB and VB of the periodic system of the elements containing no chlorine, and from an electron donor compound. The mixture is preferably in the form of a solution, especially in the form of a hydrocarbon or electron donor solution, wherein the dissolved material can be a complex formed by a magnesium compound, a transition metal compound and an electron donor compound.

According to an other embodiment the impregnation is carried out by adding a magnesium halide compound, a transition metal compound containing no chlorine and an electron donor compound to the carrier without separate dissolution. According to a further embodiment the impregnation of the carrier can be carried out by first contacting the carrier with a mixture formed from a magnesium compound and an electron donor compound and then with a mixture formed from a magnesium compound and a transition metal compound.

Suitable magnesium compounds are the Mg halides, especially magnesium dichloride. Suitable transition metal compounds are liquid compounds dissolving the magnesium compounds. Such compounds are e.g. transition metal alkoxides such as the tetraalkyltitanates (titanium tetraalkoxtdes) titanium tetraethoxide, titanium tetrapropoxide and titanium tetrabutoxide.

Suitable electron donor compounds are liquid organic compounds dissolving the magnesium compounds. Such compounds are e.g. alkylesters of carboxylic acids, aliphatic ethers, cyclic ethers, aliphatic ketones and aliphatic alcohols. Preferred electron donor compounds are ethyl acetate and tetrahydrofuran and the most preferable are aliphatic alcohols such as ethanol, propanol and butanol.

When the carrier has been treated with a magnesium halide compound, one or several transition metal compounds containing no chlorine and an electron donor compound, the reaction product or precursor resulting from the compounds and containing the electron donor, is reacted with a chlorine compound containing no transition metal or with a mixture of said chlorine compound and an organometallic compound.

Suitable or organometallic compounds are e.g. organic aluminum compounds such as trialkyl aluminums, other metal alkyls such as butyllithium, and organic silicon compounds such as hexamethyldisilazane. The most preferred organometallic compounds are the organic silicon compounds and organic aluminum compounds, and from these hexamethyldisilazane and triethylaluminum, respectively.

The chlorine compound containing no transition metal is preferably HCl, $CCl_4$, silicon chloride or especially a compound of formula $[R_nAlCl_{3-n}]_m$, wherein R is a hydrocarbon group with 1-20 carbon atoms, preferably a lower alkyl group, n is 1 or 2 and m is 1 or 2. Typical aluminum compounds suitable for chlorination are alkyl aluminum chlorides such as diethyl aluminum chloride, ethyl aluminum sesquichloride and ethyl aluminum dichloride.

It is also possible to add the organometallic compound to the carrier before impregnation of the carrier with the transition metal compound. The carrier is in that case first impregnated with a solution/sludge of the magnesium compound and the electron donor, then reacted with the organometallic compound and thereafter impregnated with a mixture of the magnesium compound and the transition metal compound in a liquid form. The product obtained is finally chlorinated with a chlorine compound containing no transition metal.

The invention also relates to a method for preparing a procatalyst composition of the type described above, wherein one or several inert, solid carriers are treated, from which carriers hydroxyl groups of the surface have optionally been removed thermally or chemically by reacting the carrier with a compound removing hydroxyl groups, by impregnating the carrier with a magnesium halide compound, with one or several compounds of transition metals of groups IVA and VA of the periodic system of the elements (Hubbard, IUPAC 1970), dissolving said magnesium compound and containing no chlorine, and an electron donor compound dissolving/suspending said Mg-compound, and treated with a chlorine compound containing no transition metal, or with a mixture of said chlorine compound and an organometallic compound.

The same definitions are valid for the method according to the invention as are for the catalyst composition defined by the method.

The method is typically carried out e.g. by removing from one or several inorganic oxides only physically bound water by drying at a temperature under 200° C., or also the hydroxyl groups of the surface by calcination at a temperature above 200° C. and/or chemically with an organosilicon compound, preferably hexamethyldisilazane.

A pre-mixture is prepared by dissolving a magnesium compound, most preferably anhydrous magnesium chloride, into a transition metal compound, such as a titanium alkoxide, preferably titanium tetrabutoxide, and dissolving/ suspending in an electron donor compound, preferably n-butanol, at a temperature above 20° C. The solution is preferably in the form of a hydrocarbon or an electron donor solution. The titanium alkoxide provides the titanium of the catalyst composition.

The Mg/Ti mole ratio can be as high as or higher than 1, preferably between 1-4. The Cl/Ti mole ratio can be about 1-10, preferably 3-5. The ED/Ti mole ratio can be between 1-100.

The pre-mixture is added to the carrier while stirring and stirring is optionally continued for 1-100 hrs at a temperature above 20° C. The hydrocarbon and/or electron donor solution is evaporated at a temperature above 20° C. until a dry, free flowing powder is obtained.

The components of the pre-mixture can also be added to the carrier without a separate dissolution so that a magnesium compound, a transition metal compound, an electron donor and optionally a hydrocarbon solvent are mixed into the carrier, whereafter the stirring of the procatalyst can be continued at a temperature above 20° C. for 1-100 hrs, and the hydrocarbon and/or electron donor solution is evaporated at a temperature above 20° C. until a dry, free flowing powder is obtained.

The impregnation of the carrier can also be carried out in two stages so that first a pre-mixture 1 is added which is prepared by dissolving a part of the magnesium compound into the electron donor compound either in a hydrocarbon solvent or without a hydrocarbon solvent, and then by adding either to the dried or undried, impregnated carrier, a pre-mixture 2, which is prepared by dissolving a part of the magnesium compound to the transition metal compound in a hydrocarbon solvent or without a hydrocarbon solvent. The obtained precursor is stirred and the stirring can be continued for 1-100 hrs at a temperature above 20° C., and finally the precursor is dried at a temperature above 20° C. until a dry, free flowing powder is obtained.

The obtained precursor is thereafter treated with a chlorine compound containing no transition metal, or with a mixture of the chlorine compound in question and an organometallic compound. It is also possible to treat the carrier with an organometallic compound before the treatment with the transition metal compound containing no chlorine. Examples of the chlorine compounds containing no transition metal as also of the organometallic compounds have been given above.

The present invention also related to the use of a procatalyst composition according to the invention in homo- and co-polymerization of olefins, wherein the polymerization is carried out by the aid of the said procatalyst composition and some organometallic co-catalyst compound of a metal belonging to the groups IA-IIIA of the periodic table of the elements. The co-catalyst compound is preferably an organometallic compound of aluminum such as a trialkylaluminum, most preferably triethylaluminum.

In addition to the procatalyst composition and the co-catalyst also a so called external electron donor can be used in the polymerization.

PREFERRED EMBODIMENTS

The invention is explained in the following by some examples.

Preparation of the catalyst

Example 1

A. Impregnation of the carrier 1.0 g of silica which had been dried at 150° C. for 4 hrs, 300 mg of anhydrous magnesium dichloride, 0.36 mL of titanium tetrabutoxide, 0.88 mL of n-butanol and 10 mL of n-heptane were added in this order while stirring to a bottle equipped with a septum. When all the materials had been added, the bottle was sealed and the mixture was stirred at 25° C. for 30 min and at 125° C. in a bath for 4 hrs. The mixture was dried at 125° C. in a bath for 20 min. 1.976 g of a free flowing powder was obtained containing 16.1 wt % of butanol and 2.6 wt % of titanium.

B. Treatment with TEA/EADC

The product of step A was suspended in 5 mL of n-pentane. 7.0 mL of a 10 wt % solution of triethyl aluminum (TEA) in pentane and 4.0 mL of a 10 wt % solution of ethyl aluminum dichloride (EADC) in pentane were added to the mixture while stirring. The mixture was stirred at 40° C. in a bath for 20 min and dried in a stream of gaseous nitrogen for 45 min. The yield was 2.621 g containing 2.4 wt % Ti, 2.8 wt % Mg, 6.8 wt % Al and 14.6 wt % Cl. The dried procatalyst was stirred for further 15 hrs at room temperature, washed 3 times with 10 mL of n-heptane and dried in a stream of gaseous nitrogen for 20 min.

The composition of the catalyst was: Ti 3.5%, Mg 4.1%, Al 2.2%, Cl 15.9%.

Example 2

A. Treatment of the carrier with hexamethyldisilazane

To 2.0 g of silica which had been dried for 4 hrs at 150° C. 15 mL of n-heptane and 0.6 mL of hexamethyldisilazane (HMDS) were added. The mixture was boiled at 50° C. in a bath for 60 min and dried at the same temperature in a stream of gaseous nitrogen for 20 min.

B. Impregnation of the carrier 995 mg of the above prepared hexamethyldisilazane-treated silica, 300 mg of magnesium dichloride, 10 mL of n-heptane, 0.36 mL of titanium tetrabutoxide and 0.88 mL of n-butanol were added in this order to a bottle provided with a septum. When all the materials had been added, the bottle was sealed and the mixture stirred at 120° C. in a bath for 4 hrs and dried at the same temperature in a stream of gaseous nitrogen for 20 min. The yield was 1.76 g.

C. Treatment with TEA/EADC

The product of step B was suspended in 5 mL of n-pentane. 6.3 mL of a 10 wt % solution of TEA in pentane and 3.4 mL of a 10 wt % solution of EADC in pentane were added. The mixture was stirred at room temperature for 20 min and dried in a stream of gaseous nitrogen for 45 min. The dried procatalyst was stirred for further 16 hrs at room temperature, washed 3 times with 10 mL of n-pentane and dried in a stream of gaseous nitrogen for 20 min.

The composition of the catalyst was: Ti 3.3 %, Mg 4.7%, Al 2.8%, Cl 18.5%.

Example 3

A. Preparation of the pre-mixture 300 mg of anhydrous magnesium dichloride were suspended in 10 mL of n-heptane. 0.36 mL of titanium tetrabutoxide and 0.88 mL of n-butanol were added to the slurry. The mixture was stirred at 120° C. in a bath for 4 hrs in order to dissolve the material completely.

B. Impregnation of the hexamethyldisilazane-treated carrier

The pre-mixture solution was transferred by siphonation into 995 mg of in example 2A prepared, hexamethyldisilazane-treated silica while stirring well. The mixture was dried in a flow of gaseous nitrogen at 120° C. in a bath for 20 min. 1.66 g of a free flowing powder was obtained containing 24.3 wt % of butanol.

C. Treatment with TEA/EADC 1.527 g of the above obtained product were suspended in 5 mL of n-pentane. 5.5 mL of a 10 wt % solution of TEA in pentane and 3.0 mL of a 10 wt % solution of EADC in pentane were added to the slurry. The mixture was stirred for 20 min at room temperature and dried in a stream of gaseous nitrogen for 45 min. The dried procatalyst was stirred for further 15 hrs at room temperature, washed 3 times with 10 mL of pentane and dried in a stream of gaseous nitrogen for 20 min.

The composition of the catalyst was: Ti 3.1%, Mg 4.6%, Al 2.2%, Cl 19.6%.

Example 4

A. Preparation of the pre-mixture 386 mg of anhydrous magnesium dichloride were suspended in 12 mL of n-heptane. 0.5 mL of titanium tetrabutoxide and 1.22 mL of n-butanol were added to the slurry. The mixture was stirred at 125° C. in a bath for 2½ hrs in order to dissolve the material completely.

B. Impregnation of the silica with the pre-mixture

The pre-mixture solution was transferred by siphonation into 3.0 g of silica which had been dried at 150° C. for 4 hrs, while stirring well. The mixture was dried in a flow of gaseous nitrogen at 125° C. for 15 min, whereby 4.4 g of a free flowing powder was obtained, containing 18.5 wt % of butanol, 1.7 wt % of titanium and 2.0 wt % of magnesium.

C. Treatment with TEA/EADC 1.0 g of the above prepared procatalyst were suspended in 4 mL of n-pentane. 3.1 mL of a 10 wt % solution of TEA in pentane and 1.4 mL of a 10 wt solution of EADC in pentane were added to the slurry. The mixture was stirred at room temperature for 20 min, dried in a stream of gaseous nitrogen for 30 min and stirred further as dry at room temperature for 16½ hrs.

The composition of the catalyst was: Ti 1.2%, Mg 1.5%, Al 5.5%, Cl 9.7%.

Example 5

A. Treatment of the carrier with hexamethyldisilazane

To 3.0 g silica (Davison 955) 15 mL of n-pentane and 1.35 mL of hexamethyldisilazane were added. The mixture was boiled at 50° C. in a bath for 60 min and dried at the same temperature for ½ hr, whereby a dry, free flowing carrier powder was obtained.

B. Preparation of the pre-mixture 386 mg of anhydrous magnesium dichloride were suspended in 7 mL of toluene. 0.5 mL of titanium tetrabutoxide and 1.0 mL of n-butanol were added to the slurry. The mixture was stirred at 120° C. in a bath for 3 hrs in order to dissolve the material completely.

C. Impregnation of the carrier with the pre-mixture

The pre-mixture solution was transferred by siphonation into hexamethyldisilazane-treated carrier while stirring well. The mixture was dried in a flow of gaseous nitrogen at 80° C. in a bath for 30 min, whereby a dry, free flowing powder was obtained containing 20.3 wt % of butanol, 1.1 wt % of titanium and 1.8 wt % of magnesium.

D. Treatment with TEA/EADC (=example 5a)

1.0 g of the above prepared procatalyst were suspended in 3 mL of n-pentane. 4.1 mL of a 10 wt % solution of TEA in pentane and 1.1 mL of a 10 wt % solution of EADC in pentane were added to the slurry. The mixture was stirred at room temperature for 20 min, dried in a flow of gaseous nitrogen for 20 min and stirred further as dry at room temperature for 16 hrs.

The composition of the catalyst was: Ti 1.3%, Mg 1.6%, Al 7.9%, Cl 8.2%.

D. Treatment with TEA/DEAC (=example 5b)

1.0 g of the procatalyst prepared in step C were suspended in 3 mL of n-pentane. 4.1 mL of a 10 wt % solution of TEA in pentane and 2.1 mL of a 10 wt % solution of diethyl aluminum chloride (DEAC) in pentane were added to the slurry. The mixture was stirred at room temperature for 20 min, dried in a flow of gaseous nitrogen for 20 min and stirred further as dry at room temperature for 16 hrs.

The composition of the catalyst was: Ti 1.2%, Mg 1.5%, Al 7.1%, Cl 7.5%.

Example 6

A. Treatment of the carrier with hexamethyldisilazane

To 1.1 g of silica 5 mL of n-pentane and 0.2 mL of hexamethyldisilazane were added. The mixture was boiled at 50° C. in a bath for 60 min and dried at the same temperature for ½ hr, whereby a dry, free flowing carrier powder was obtained.

B. Impregnation of the carrier

To 1.06 g of the above prepared HMDS-treated silica 320 mg of anhydrous magnesium chloride, 5.0 mL of n-butanol and 0.36 mL of titanium tetrabutoxide were added in this order while stirring to bottle equipped with a septum. When all the materials had been added, the bottle was sealed and the mixture was stirred at 120° C. in a bath for 4 hrs. The mixture was dried at the same temperature in a stream of gaseous nitrogen for 3 hrs, whereby a free flowing powder was obtained containing 15.6 wt % of butanol and 3.0 wt % of titanium.

C. Treatment with DEAC 200 mg of the above obtained product were suspended in 0.5 mL of n-pentane. 0.94 mL of a 10 wt % solution of DEAC in pentane was added to the mixture and the mixture was stirred at room temperature for 20 min, at 45° C. in a bath for 1 hr and dried at 45° C. in a bath with a stream of gaseous nitrogen for 20 min.

The composition of the catalyst was: Ti 2.5%, Mg 3.6%, Al 4.8%, Cl 17.4%.

Example 7

A. Treatment of the carrier with hexamethyldisilazane

To 3.0 g of silica (Davison 955) which had been dried at 200° C. for 4 hrs, 15 mL of n-pentane and 0.8 mL of hexamethyldisilazane were added. The mixture was boiled at 50° C. in a bath for 60 min and dried at the same temperature in a stream of gaseous nitrogen for 20 min.

B. Preparation of the pre-mixture 386 mL of anhydrous magnesium dichloride were suspended in 12 mL of toluene. 0.5 mL of titanium tetrabutoxide and 1.0 mL of n-butanol were added to the slurry. The mixture was stirred at 120° C. in a bath for 5½ hrs in order to dissolve the material completely.

C. Impregnation of the carrier with the pre-mixture

The pre-mixture solution was transferred by siphonation into the carrier while stirring well. The mixture was dried in a flow of gaseous nitrogen at 80° C. in a bath for 45 min, whereby a free flowing powder was obtained containing 18.1 wt % of butanol, 1.2 wt % of titanium and 1.7 wt % of magnesium.

D. Treatment with TEA/EADC 0.5 g of the above prepared procatalyst were suspended in 1.5 mL of n-pentane. 2.17 mL of a 10 wt % solution of TEA in pentane and 0.5 mL of a 10 wt % solution of EADC in pentane were added to the slurry. The mixture was stirred at room temperature for 20 min, dried in a flow of gaseous nitrogen for 20 min and stirred further as dry for 16 hrs.

The composition of the catalyst was: Ti 0.98%, Mg 1.5%, Al 6.6%, Cl 8.4%.

Example 8

A. Treatment of the carrier with hexamethyldisilazane

To 3.0 g of silica (Davison 955) 15 mL of n-pentane and 1.35 mL of HMDS Were added. The mixture was boiled at 50° C. in a bath for 60 min and dried at the same temperature in a stream of gaseous nitrogen for ½ hr, whereby a dry, free flowing carrier powder was obtained.

B. Preparation of the pre-mixture 322 mg of anhydrous magnesium dichloride, 1.0 mL of n-butanol and 7.0 mL of toluene were stirred in a bottle equipped with a septum at 120° C. in a bath for 3 hrs in order to dissolve the material completely. 0.4 mL of titanium tetrabutoxide was added to the solution, and the mixture was stirred at 120° C. in a bath for 15 min.

C. Impregnation of the carrier with the pre-mixture

The pre-mixture solution was transferred by siphonation into the carrier while stirring well. The mixture was dried in a flow of gaseous nitrogen at 80° C. in a bath for ½ hr, whereby a free flowing powder was obtained containing 16.5 wt % of butanol, 1.5 wt % of titanium and 1.5 wt % of magnesium.

D. Treatment with TEA/EADC 1.0 g of the above prepared procatalyst were suspended in 3 mL of n-pentane. 3.96 mL of a 10 wt % solution of TEA in pentane and 1.16 mL of a 10 wt % solution of EADC in pentane were added to the slurry. The mixture was stirred at room temperature for 20 min, dried in a flow of gaseous nitrogen for 20 min and stirred as dry for further 16 hrs.

The composition of the catalyst was: Ti 1.6%, Mg 1.3%, Al 5.8%, Cl 7.3%.

Example 9

A. Preparation of the pre-mixture 1

3.9 g of anhydrous magnesium dichloride were suspended in 30 mL of n-pentane. 14.4 mL of dry ethanol was added to the slurry. The mixture was boiled at 105° C. in a bath for 1½ hrs in order to dissolve the material completely.

B. Impregnation of the silica with the pre-mixture 1

12.0 g of silica (Davison 955) which had been activated at 800° C. were added to the pre-mixture 1. The mixture was stirred for 10 min at 105° C. in a bath and dried in a stream of gaseous nitrogen at the same temperature for 2 hrs. 17.95 g of a free flowing powder was obtained containing 16.8 wt % of ethanol.

C. Treatment with HMDS

To 8.975 g of the above prepared impregnated carrier 40 mL of n-pentane and 7.6 mL of hexamethyldisilazane were added. The mixture was stirred at 50° C. in a bath for 1 hr, dried in a steam of gaseous argon at the same temperature for 2 hrs, washed twice at room temperature with 50 mL of pentane and dried by purging with argon for 20 min.

D. Preparation of the pre-mixture 2

386 mg of anhydrous magnesium/dichloride and 2.8 mL of titanium tetrabutoxide were stirred at 120° C. in a bath for 1¼ hrs in order to dissolve the material completely. 3 mL of n-pentane was added to the solution.

E. Impregnation of the carrier with the pre-mixture 2

The pre-mixture solution 2 was transferred by siphonation into 7.5 g of the product of step C, which remained a flowing powder during the whole addition. When all of the premixture had been added, the catalyst was stirred as dry at room temperature for further 24 hrs.

F. Treatment with EADC

To 1 g of the above prepared procatalyst 2.8 mL of a 10 wt % solution of EADC in pentane were added. The mixture was stirred at room temperature for 20 min and dried in a stream of gaseous nitrogen.

The composition of the catalyst was: Ti 2.9%, Mg 4%, Al 4.3%, Cl 21.3%.

Example 10

A. Treatment of the silica with hexamethyldisilazane

To 6.0 g of silica (Davison 955) which had been activated at 800° C. 30 mL of n-pentane and 0.78 mL of hexamethyldisilazane were added. The mixture was stirred at 50° C. in a bath for 1 hr and dried at the same temperature in a stream of gaseous nitrogen for 20 min.

B. Preparation of the pre-mixture 1 and impregnation into the carrier 1.95 g of anhydrous magnesium dichloride and 57.5 mn of tetrahydrofuran were stirred at 80° C. in a bath for 7.5 hrs in order to dissolve the material completely. The solution was transferred by siphonation into hexamethyldisilazane-treated silica while stirring well. The mixture was dried at 80° C. in a bath for 4 hrs 45 min, whereby a free flowing powder was obtained containing 21.8 wt % of tetrahydrofuran and 4.5 wt % of magnesium.

C. Preparation of the pre-mixture 2 and impregnation into the carrier 386 mg of anhydrous magnesium dichloride, 2.8 mL of titanium tetrabutoxide and 3 mL of n-pentane were stirred at 50° C. in a bath for 18 hrs in order to dissolve the material completely. The solution was transferred by siphonation into the carrier treated with the magnesium/dichloride-THF-solution, which carrier remained as a flowing powder during the whole addition. The procatalyst was stirred as dry at room temperature for further 24 hrs and it contained 15.3 wt % of THF, 4.2 wt % of magnesium, 2.8 wt % of titanium and 12.6 wt % of chlorine.

D. Treatment with EADC

To 1 g of the above prepared procatalyst 2.3 mL of a 10 wt % solution of EADC in pentane was added. The mixture was stirred at room temperature for 20 min and dried in a stream of gaseous nitrogen for 20 min.

The composition of the catalyst was: Ti 2.8%, Mg 4.1%, Al 2.9%, Cl 18.9%.

Example 11

A. Treatment of the carrier with hexamethyldisilazane 3.0 g of silica (Davison 955) which had been activated at 600° C., 20 mL of n-pentane and 0.39 mL of hexamethyldisilazane were stirred at 50° C. in a bath for 1 hr and dried at the same temperature in a stream of gaseous nitrogen for 30 min.

B. Preparation of the pre-mixture 320 mg of anhydrous magnesium dichloride, 0.36 mL of titanium tetrabutoxide and 7.0 mL of n-butanol were stirred at 110° C. in a bath for 3 hrs in order to dissolve the material completely.

C. Impregnation of the carrier with the pre-mixture

The pre-mixture solution was transferred by siphonation into 2.505 g of the above prepared HMDS-treated silica. The mixture was stirred at 110° C. in a bath for 1 hr and dried in a stream of gaseous argon at the same temperature for 3 hrs 45 min, whereby a free flowing powder was obtained containing 12.9 wt % of butanol, 1.3 wt % of titanium and 2.4 wt % of magnesium.

D. Treatment with TEA/EADC 1.024 g of the above prepared procatalyst were suspended in 3 mL of n-pentane. 2.50 mL of a 10 wt % solution of TEA in pentane and 1.2 mL of a 10 wt % solution of EADC in pentane were added to the slurry. The mixture was stirred at 45° C. in a bath for 20 min and dried at the same temperature for a stream of gaseous argon for 20 min. The catalyst was stirred as dry at room temperature for further 16 hrs.

The composition of the catalyst was: Ti 1.3%, Mg 2.0%, Al 4.8%, Cl 9.6%.

Example 12

A. Treatment of the carrier with hexamethyldisilazane 4.0 mL of hexamethyldisilazane were added to 2.0 g of silica while stirring well and the mixture was allowed to stand at room temperature for a week in a sealed bottle equipped with a septum. The mixture was suspended in 7.0 mL of n-heptane, stirred at 85° C. in a bath for 15 min and dried at the same temperature in a stream of gaseous nitrogen for 30 min.

B. Preparation of the pre-mixture 417 mg of anhydrous magnesium dichloride, 0.54 mL of titanium tetrabutoxide and 4.2 mL of ethanol were stirred at 110° C. in a bath for 20 min in order to dissolve the material completely.

C. Impregnation of the carrier with the pre-mixture

The pre-mixture solution was transferred by siphonation into 1.2 g of the above prepared HMDS-treated silica. The mixture was stirred at 110° C. in a bath for 1 hr and dried in a stream of nitrogen at 100° C. in a bath for 1 hr, whereby a free flowing powder was obtained containing 15.1 wt % of ethanol, 3.3 wt % of titanium and 4.0 wt % of magnesium.

D. Treatment with DEAC 5,1 mL of a 10 wt % solution of diethylaluminum in pentane were added to 1 g of the above prepared procatalyst powder. The mixture was stirred at 40° C. in a bath for 4 hrs and dried at 45° C. in a bath for 5 min.

The composition of the catalyst was: Ti 2.6%, Mg 3.1%, Al 7.8%, Cl 20.3%.

Example 13

A. Treatment of the carrier with triethylaluminum

To 6.0 g of silica which had been activated at 600° C. 36 mL of n-pentane and 5.13 mL of a 10 wt % solution of triethylaluminum in pentane were added. The mixture was stirred at 50° C. in a bath for 30 min and dried in a stream of gaseous nitrogen at the same temperature for ½ hr.

B. Preparation of the pre-mixture 1.36 mg of anhydrous magnesium dichloride, 60 mL of tetrahydrofuran and 1.53 mL of titanium tetraisopropoxide (TiPT) were stirred at 85° C. in a bath for 30 min in order to dissolve the material completely.

C. Impregnation of the carrier with the pre-mixture

The pre-mixture solution was transferred by siphonation into 4.0 g of the above prepared carrier. The mixture was stirred 85° C. in a bath for 1 hr and dried at the same temperature for 6 hrs 45 min. The dry, free flowing procatalyst powder contained 2.6% of titanium and 15.9% of tetrahydrofuran.

D. Treatment with DEAC

The treatment was carried out in the same way as in step D of example 12 except that 680 mg of the procatalyst and 2.52 mL of a 10 wt % solution of DEAC in pentane were used.

The composition of the catalyst was: Ti 2.3%, Mg 3.3%, Al 5.3%, Cl 16.6%.

Polymerization

1. Homopolymerization of ethene

Using the catalysts prepared according to examples 1–10, ethane was polymerized in pentane as follows:

In a 3-L reactor 1.8 L of n-pentane treated with oxygen and moisture scavengers were added. Then 30–50 mg of procatylst dissolved in a small amount of pentane were added to the reactor through a feeding funnel and the temperature was raised to 80° C. A 0.5-L reactor was pressurized with hydrogen to a pressure of 5 bars (e.g. 1* 10 bars). This amount of hydrogen was fed to the reactor together with the 10 wt % solution of triethylaluminum (TEA/Ti=30–50 mol/mol) in pentane as a co-catalyst and gaseous ethene as the monomer. The total pressure was raised to 15 bars with ethene, the temperature was raised to 90° C., and the polymerization was continued for 60 min. Ethene was continuously fed into the reactor in order to keep the pressure constant.

Using the catalysts prepared according to examples 11–13, ethene was polymerized in isobutane as follows:

In a 3-L reactor 1.8 L of isobutane treated with oxygen and moisture scavengers were added. Then 30–80 mg of the catalyst suspended in a small amount of pentane and 0.8–1.35 mL of a 10 wt % solution of TEA in pentane as a co-catalyst were added. The temperature was raised to 90° C. (example 11) or 95° C. (examples 12–13). A 0.5-L reactor was pressurized with hydrogen to a pressure of 5 bars and hydrogen was fed to the reactor together with gaseous ethene until the total pressure was 27 bars. The polymerization was continued for 1 hr and the total pressure was kept constant with a feed of ethene.

2. Co-polymerization of ethene

Co-polymerization of ethene and alpha-olefins was carried out in the same way as for the homo-polymerization except that the co-monomer (180 g of 1-butene) was added to the reaction medium (1.8 L of isobutane) immediately after the addition of co-catalyst.

The results of polymerization with catalyst components prepared according to the examples 1–13 are shown in the Table.

TABLE

| | Polymerization results | | | | |
|---|---|---|---|---|---|
| | Activity | | MI | MFR | BD |
| Example | kg/g cat. | kg/g Ti | (21.6) | (21/2) | kg/m³ |
| 1 | 10.0 | 286 | 15.75 | 29.79 | 360 |
| 1* | 6.8 | 195 | 124.60 | 31.12 | 280 |
| 2 | 7.9 | 241 | 11.55 | 32.94 | 230 |
| 3 | 9.9 | 318 | 14.49 | 33.35 | 280 |
| 4 | 4.4 | 368 | 17.00 | 30.49 | 290 |
| 5a | 5.5 | 426 | 17.55 | 26.50 | 330 |
| 5b | 6.1 | 510 | 13.56 | 29.60 | 300 |
| 6 | 5.4 | 217 | 8.06 | 28.79 | 270 |
| 7 | 4.0 | 405 | 23.00 | 31.60 | 340 |
| 8 | 4.1 | 257 | 8.20 | 31.70 | 220 |
| 9 | 3.2 | 109 | 17.88 | 29.10 | 300 |
| 10 | 4.0 | 141 | 14.58 | 29.80 | 300 |
| 11* | 2.3 | 178 | 5.21 | 29.18 | 240 |

TABLE-continued

| | Polymerization results | | | | |
|---|---|---|---|---|---|
| | Activity | | MI | MFR | BD |
| Example | kg/g cat. | kg/g Ti | (21.6) | (21/2) | kg/m³ |
| 11 | 2.5 | 189 | 34.00 | 27.00 | 226 |
| 12 | 8.6 | 332 | 19.20 | 30.68 | 400 |
| 13 | 6.8 | 302 | 11.70 | 26.10 | 350 |

11*: Polymerization medium isobutane, in others pentane.
1*: Hydrogen pressure in 0,5-L reactor 10 bars, in others 5 bars.
11*: Co-polymerization with 1-butene.
MI: Melt index
MFR: Melt flow ratio
BD: Bulk density

We claim:

1. A method for preparing an olefin polymerization catalyst composition consisting essentially of a titanium-containing procatalyst and a cocatalyst, said method consisting essentially of:

A. preparing the procatalyst by:
  a) stirring a dry silica, alumina or magnesium silicate carrier with magnesium dichloride and a titanium tetraalkoxide suspended in a hydrocarbon solvent and an electron donor selected from the group consisting of ethanol, propanol and butanol, said titanium tetraalkoxide providing the titanium for the catalyst composition;
  b) evaporating the hydrocarbon solvent and electron donor to form a free-flowing powder; and
  c) chlorinating the titanium tetraalkoxide in the flee-flowing powder with an alkyl aluminum chloride of the formula

wherein R is a $C_{1-20}$ hydrocarbyl group, n is 1 or 2, and m is 1 or 3; and

B. adding to the procatalyst a cocatalyst consisting essentially of an organometallic compound of a group IA to IIIA metal.

2. A method according to claim 1, wherein hydroxyl groups on said carrier were removed prior to step a) by reaction with hexamethyldisilazane.

3. A method according to claim 1, wherein the titanium tetraalkoxide is titanium tetraethoxide, titanium tetrapropoxide or titanium tetrabutoxide.

4. A method according to claim 1, wherein the alkyl aluminum chloride is ethyl aluminum chloride, diethyl aluminum chloride or ethyl aluminum sesquichloride.

5. A method according to claim 1, wherein the alkyl aluminum chloride is mixed with a trialkyl aluminum compound.

6. A method according to claim 1, wherein an external electron donor is added to the catalyst composition after the cocatalyst has been added to the protocatalyst.

* * * * *